(12) United States Patent
Perero-Codosero et al.

(10) Patent No.: US 11,488,608 B2
(45) Date of Patent: Nov. 1, 2022

(54) METHOD AND SYSTEM TO ESTIMATE SPEAKER CHARACTERISTICS ON-THE-FLY FOR UNKNOWN SPEAKER WITH HIGH ACCURACY AND LOW LATENCY

(71) Applicant: SIGMA TECHNOLOGIES, S.L., Madrid (ES)

(72) Inventors: Juan Manuel Perero-Codosero, Alcobendas (ES); Fernando Espinoza-Cuadros, Alcobendas (ES)

(73) Assignee: SIGMA TECHNOLOGIES GLOBAL LLC, Madrid (ES)

( * ) Notice: Subject to any disclaimer, the term of this patent is extended or adjusted under 35 U.S.C. 154(b) by 199 days.

(21) Appl. No.: 16/632,744

(22) PCT Filed: Dec. 16, 2019

(86) PCT No.: PCT/ES2019/070849
§ 371 (c)(1),
(2) Date: Jan. 21, 2020

(87) PCT Pub. No.: WO2021/123462
PCT Pub. Date: Jun. 24, 2021

(65) Prior Publication Data
US 2021/0407523 A1    Dec. 30, 2021

(51) Int. Cl.
G10L 17/26        (2013.01)
G10L 15/02        (2006.01)
G10L 25/30        (2013.01)

(52) U.S. Cl.
CPC ............. *G10L 17/26* (2013.01); *G10L 15/02* (2013.01); *G10L 25/30* (2013.01)

(58) Field of Classification Search
CPC ......... G10L 15/00; G10L 15/02; G10L 17/00; G10L 17/02; G10L 17/26; G10L 25/30
See application file for complete search history.

(56) References Cited

U.S. PATENT DOCUMENTS

| 7,970,115 B1 * | 6/2011 | Coughlan ............... G10L 21/00 379/202.01 |
| 9,564,123 B1 | 2/2017 | Mont-Reynaud et al. |

(Continued)

FOREIGN PATENT DOCUMENTS

| WO | WO-2016209888 A1 | 12/2016 |
| WO | WO-2019089432 A1 | 5/2019 |
| WO | WO-2020161481 A1 * | 8/2020 ............... G06N 3/08 |

OTHER PUBLICATIONS

Huang, Rongqing, and John HL Hansen. "Gaussian Mixture Selection and Data Selection for Unsupervised Spanish Dialect Classification." Ninth International Conference on Spoken Language Processing. 2006. (Year: 2006).*

(Continued)

*Primary Examiner* — Paras D Shah

(57) ABSTRACT

A computer-implemented technique is presented for profiling an unknown speaker. A DNN-based frame selection allows the system to select the relevant frames necessary to provide a reliable speaker characteristic estimation. A frame selection module selects those frames that contain relevant information for estimating a given speaker characteristic and thereby contributes to the accuracy and the low latency of the system. Real-time speaker characteristics estimation allows the system to estimate the speaker characteristics from a speech segment of accumulated selected frames at any given time. The frame level processing contributes to the low latency as it is not necessary to wait for the whole speech utterance to predict a speaker characteristic but rather a speaker characteristic is estimated from only a few reliable frames. Different stopping criteria also contribute to the accuracy and the low latency of the system.

19 Claims, 11 Drawing Sheets

(56) References Cited

U.S. PATENT DOCUMENTS

| | | | | |
|---|---|---|---|---|
| 10,127,911 B2* | 11/2018 | Kim | ............ | G10L 17/26 |
| 10,395,640 B1* | 8/2019 | Beach | ............ | G10L 15/01 |
| 2007/0100622 A1* | 5/2007 | Tavares | ............ | G10L 17/06 |
| | | | | 704/250 |
| 2014/0358541 A1* | 12/2014 | Colibro | ............ | G10L 15/063 |
| | | | | 704/245 |
| 2015/0371639 A1* | 12/2015 | Foerster | ............ | G10L 17/02 |
| | | | | 704/233 |
| 2018/0276569 A1* | 9/2018 | Oguri | ............ | G10L 15/02 |
| 2021/0027789 A1* | 1/2021 | Grancharov | ............ | G10L 17/06 |

OTHER PUBLICATIONS

Weddin, Maia EM, and Ass Prof Ole Winther. "Frame selection for speaker identification." (2005). (Year: 2005).*

Sun, Hanwu, et al. "The IIR NIST SRE 2008 and 2010 summed channel speaker recognition systems." INTERSPEECH. 2010. (Year: 2010).*

Ethridge, James, and Ravi P. Ramachandran. "Rank-based frame classification for usable speech detection in speaker identification systems." 2015 IEEE international conference on digital signal processing (DSP). IEEE, 2015. (Year: 2015).*

Zhang, Xingyu, et al. "Noise robust speaker recognition based on adaptive frame weighting in GMM for i-vector extraction." IEEE Access 7 (2019): 27874-27882. (Year: 2019).*

International Search Report for co-pending application PCT/ES2019/070849 including Examiner's Written Opinion, dated Aug. 19, 2020.

* cited by examiner

Entries in the table represent two-tailed probabilities for z statistics

| tenths | hundredths | | | | | | | | | |
|---|---|---|---|---|---|---|---|---|---|---|
| | +0.00 | +0.01 | +0.02 | +0.03 | +0.04 | +0.05 | +0.06 | +0.07 | +0.08 | +0.09 |
| 0.0 | 1.0000 | 0.9920 | 0.9840 | 0.9761 | 0.9681 | 0.9601 | 0.9522 | 0.9442 | 0.9362 | 0.9283 |
| 0.1 | 0.9203 | 0.9124 | 0.9045 | 0.8966 | 0.8887 | 0.8808 | 0.8729 | 0.8650 | 0.8572 | 0.8493 |
| 0.2 | 0.8415 | 0.8337 | 0.8259 | 0.8181 | 0.8103 | 0.8026 | 0.7949 | 0.7872 | 0.7795 | 0.7718 |
| 0.3 | 0.7642 | 0.7566 | 0.7490 | 0.7414 | 0.7339 | 0.7263 | 0.7188 | 0.7114 | 0.7039 | 0.6965 |
| 0.4 | 0.6892 | 0.6818 | 0.6745 | 0.6672 | 0.6599 | 0.6527 | 0.6455 | 0.6384 | 0.6312 | 0.6241 |
| 0.5 | 0.6171 | 0.6101 | 0.6031 | 0.5961 | 0.5892 | 0.5823 | 0.5755 | 0.5687 | 0.5619 | 0.5552 |
| 0.6 | 0.5485 | 0.5419 | 0.5353 | 0.5287 | 0.5222 | 0.5157 | 0.5093 | 0.5029 | 0.4965 | 0.4902 |
| 0.7 | 0.4839 | 0.4777 | 0.4715 | 0.4654 | 0.4593 | 0.4533 | 0.4473 | 0.4413 | 0.4354 | 0.4295 |
| 0.8 | 0.4237 | 0.4179 | 0.4122 | 0.4065 | 0.4009 | 0.3953 | 0.3898 | 0.3843 | 0.3789 | 0.3735 |
| 0.9 | 0.3681 | 0.3628 | 0.3576 | 0.3524 | 0.3472 | 0.3421 | 0.3371 | 0.3320 | 0.3271 | 0.3222 |
| 1.0 | 0.3173 | 0.3125 | 0.3077 | 0.3030 | 0.2983 | 0.2937 | 0.2891 | 0.2846 | 0.2801 | 0.2757 |
| 1.1 | 0.2713 | 0.2670 | 0.2627 | 0.2585 | 0.2543 | 0.2501 | 0.2460 | 0.2420 | 0.2380 | 0.2340 |
| 1.2 | 0.2301 | 0.2263 | 0.2225 | 0.2187 | 0.2150 | 0.2113 | 0.2077 | 0.2041 | 0.2005 | 0.1971 |
| 1.3 | 0.1936 | 0.1902 | 0.1868 | 0.1835 | 0.1802 | 0.1770 | 0.1738 | 0.1707 | 0.1676 | 0.1645 |
| 1.4 | 0.1615 | 0.1585 | 0.1556 | 0.1527 | 0.1499 | 0.1471 | 0.1443 | 0.1416 | 0.1389 | 0.1362 |
| 1.5 | 0.1336 | 0.1310 | 0.1285 | 0.1260 | 0.1236 | 0.1211 | 0.1187 | 0.1164 | 0.1141 | 0.1118 |
| 1.6 | 0.1096 | 0.1074 | 0.1052 | 0.1031 | 0.1010 | 0.0989 | 0.0969 | 0.0949 | 0.0930 | 0.0910 |
| 1.7 | 0.0891 | 0.0873 | 0.0854 | 0.0836 | 0.0819 | 0.0801 | 0.0784 | 0.0767 | 0.0751 | 0.0735 |
| 1.8 | 0.0719 | 0.0703 | 0.0688 | 0.0672 | 0.0658 | 0.0643 | 0.0629 | 0.0615 | 0.0601 | 0.0588 |
| 1.9 | 0.0574 | 0.0561 | 0.0549 | 0.0536 | 0.0524 | 0.0512 | 0.0500 | 0.0488 | 0.0477 | 0.0466 |
| 2.0 | 0.0455 | 0.0444 | 0.0434 | 0.0424 | 0.0414 | 0.0404 | 0.0394 | 0.0385 | 0.0375 | 0.0366 |
| 2.1 | 0.0357 | 0.0349 | 0.0340 | 0.0332 | 0.0324 | 0.0316 | 0.0308 | 0.0300 | 0.0293 | 0.0285 |
| 2.2 | 0.0278 | 0.0271 | 0.0264 | 0.0257 | 0.0251 | 0.0244 | 0.0238 | 0.0232 | 0.0226 | 0.0220 |
| 2.3 | 0.0214 | 0.0209 | 0.0203 | 0.0198 | 0.0193 | 0.0188 | 0.0183 | 0.0178 | 0.0173 | 0.0168 |
| 2.4 | 0.0164 | 0.0160 | 0.0155 | 0.0151 | 0.0147 | 0.0143 | 0.0139 | 0.0135 | 0.0131 | 0.0128 |
| 2.5 | 0.0124 | 0.0121 | 0.0117 | 0.0114 | 0.0111 | 0.0108 | 0.0105 | 0.0102 | 0.0099 | 0.0096 |
| 2.6 | 0.0093 | 0.0091 | 0.0088 | 0.0085 | 0.0083 | 0.0080 | 0.0078 | 0.0076 | 0.0074 | 0.0071 |
| 2.7 | 0.0069 | 0.0067 | 0.0065 | 0.0063 | 0.0061 | 0.0060 | 0.0058 | 0.0056 | 0.0054 | 0.0053 |
| 2.8 | 0.0051 | 0.0050 | 0.0048 | 0.0047 | 0.0045 | 0.0044 | 0.0042 | 0.0041 | 0.0040 | 0.0039 |
| 2.9 | 0.0037 | 0.0036 | 0.0035 | 0.0034 | 0.0033 | 0.0032 | 0.0031 | 0.0030 | 0.0029 | 0.0028 |
| 3.0 | 0.0027 | 0.0026 | 0.0025 | 0.0024 | 0.0024 | 0.0023 | 0.0022 | 0.0021 | 0.0021 | 0.0020 |
| 3.1 | 0.0019 | 0.0019 | 0.0018 | 0.0017 | 0.0017 | 0.0016 | 0.0016 | 0.0015 | 0.0015 | 0.0014 |
| 3.2 | 0.0014 | 0.0013 | 0.0013 | 0.0012 | 0.0012 | 0.0012 | 0.0011 | 0.0011 | 0.0010 | 0.0010 |
| 3.3 | 0.0010 | 0.0009 | 0.0009 | 0.0009 | 0.0008 | 0.0008 | 0.0008 | 0.0008 | 0.0007 | 0.0007 |
| 3.4 | 0.0007 | 0.0007 | 0.0006 | 0.0006 | 0.0006 | 0.0006 | 0.0006 | 0.0005 | 0.0005 | 0.0005 |
| 3.5 | 0.0005 | 0.0005 | 0.0005 | 0.0004 | 0.0004 | 0.0004 | 0.0004 | 0.0004 | 0.0004 | 0.0003 |
| 3.6 | 0.0003 | 0.0003 | 0.0003 | 0.0003 | 0.0003 | 0.0003 | 0.0003 | 0.0003 | 0.0003 | 0.0002 |
| 3.7 | 0.0002 | 0.0002 | 0.0002 | 0.0002 | 0.0002 | 0.0002 | 0.0002 | 0.0002 | 0.0002 | 0.0002 |
| 3.8 | 0.0001 | 0.0001 | 0.0001 | 0.0001 | 0.0001 | 0.0001 | 0.0001 | 0.0001 | 0.0001 | 0.0001 |
| 3.9 | 0.0001 | 0.0001 | 0.0001 | 0.0001 | 0.0001 | 0.0001 | 0.0001 | 0.0001 | 0.0001 | 0.0001 |
| 4.0 | 0.0000 | 0.0000 | 0.0000 | 0.0000 | 0.0000 | 0.0000 | 0.0000 | 0.0000 | 0.0000 | 0.0000 |

Figure 10

METHOD AND SYSTEM TO ESTIMATE SPEAKER CHARACTERISTICS ON-THE-FLY FOR UNKNOWN SPEAKER WITH HIGH ACCURACY AND LOW LATENCY

CROSS-REFERENCE TO RELATED APPLICATIONS

This application is a U.S. National Phase Application under 35 U.S.C. 371 of International Application No. PCT/ES2019/070849 filed on Dec. 16, 2019. The entire disclosure of the above application is incorporated herein by reference.

FIELD

The present disclosure relates to speaker profiling by means of speaker characteristic estimation from the speech signal. The speech signal contains specific characteristic information related to physical (e.g., gender, age, height, weight, BMI), geographical (e.g., language, accent), sociolect (e.g., dialect) and/or ethnic background (e.g., race) of the speaker.

BACKGROUND

Speech analytics technologies have been applied to several areas like communication, marketing, and security. Speech analytics adds value to these areas in different ways by providing specific information about speakers. This information can be obtained from the speech signal. The speech signal contains speaker characteristics which can be extracted automatically to know specific aspects of a person.

There is a strong benefit to perform the extraction of speaker characteristics in real-time, e.g., for security alerts it is necessary to have a minimum response time, or for sales agents working in call centers it is very helpful to make recommendations personalized to a particular speaker in "conversation time". To get quick responses, a system low latency is required.

System accuracy is also critical for these applications because it is important to make the right decision, as mistakes can have negative consequences for the security of the people involved, or provide a bad experience to customers if the response does not fulfill their expectations.

A few prior art systems are noted below. One system focuses on identifying speakers for call centers. Call center applications need to work in real-time to provide an output in a reasonable time interval. However, this system does not provide information about speaker characteristics. It only provides the identity of known speakers, i.e. speakers previously enrolled in the system. Moreover, the implementation is not based on DNN architectures.

Other speaker identification systems operating in real-time for applications such as web-based conferencing have emerged as well. Most of these speaker identification/recognition applications have been used to detect who is speaking along the conversation, also called speaker diarization, or generating a profile (e.g., age, gender, job occupation) about who is speaking with the goal reinforcing the speaker identification task with additional speaker characteristics to overcome the lack of context information, or associate additional speaker data to a speaker that was previously enrolled. Unlike these approaches, the system proposed in this disclosure performs speech analytics for unknown speakers (i.e. not enrolled speakers in the system). The proposed system provides characteristics 'on-the-fly' for an unknown speaker like the gender, age, height, body mass index (BMI), or language from the speech signal.

Speaker recognition systems have also been used to train hierarchical speaker clusters. Voice data from known speakers and associated label are employed in the cluster training process. Labels contain information about gender, age and native language. Clusters are based on Gaussian Mixture Models (GMMs) and Mel-Frequency Cepstral Coefficients (MFCCs) were used in the training process. During the recognition phase a test speaker is associated to a speaker identity and at the same time is assigned to a speaker cluster. In contrast, the proposed system is based on Deep Neural Networks (DNNs) models, one model for each characteristic. These models are trained using speech from speakers who are different from the test ones (unknown speakers).

The technique presented in this disclosure makes use of frame selection to extract the relevant frames of interest. While this disclosure proposes the use of DNNs to extract the best frames of interest for each speaker characteristic extracted, other techniques such as Voice Activity Detection (VAD) could potentially be used to separate speech for silence, so that only speech segments would be considered in the estimation of speaker characteristics. However, while VAD makes use of a short-term energy analysis, Deep Learning-based analysis was shown, in the context of a speaker verification task, to improve performance to carry out frame selection.

Other known techniques use physical characteristics to improve the accuracy of the speaker identification. It consists in the extraction and analysis of vocal characteristics and frequently used words in the voice segment. The extracted information helps to fill a database linking the age, gender even ethnic group with the speaker identity. Similarly, techniques have been developed to provide a likely age range associated with the speaker based on the evaluation of a spoken phrase in terms of prosody such as speaker rate, number and length of pauses in the spoken phrase, misarticulation of a portion of the spoken phrase, and vocal intensity of the caller's voice.

Regarding the topic of speaker characteristics prediction, there is work in the art related to age prediction, height estimation or BMI classification from speech. None of these methods need to obtain live results and they have not been developed using DNN-based algorithms. In contrast, the proposed system achieves speaker characteristics 'on-the-fly' and is based on DNN architectures.

Breakthroughs in Deep Learning has led to development of accurate methods estimating speaker characteristics offline with DNN-based models (e.g., age estimation) and by mixing DNN-models with other technologies such as facial recognition. In contrast, the proposed system, which is also based on DNNs architectures, performs live speaker characteristics estimation providing results with a very low latency.

Low latency is one of the main points of this disclosure. Achieving the extraction of speaker characteristics in the shortest amount of time allows to provide better services by enhancing the user experience. Such systems are able to help sales agents working in call centers or intelligent agents (or bots) making recommendations to offer a customized product or specific services according to the customer characteristics. Using "on-the-fly" specific characteristics extraction enables systems to offer new products, services or specific content to customers nearly real-time. Just a few seconds can make a difference between a high-quality service and a poor service. Another important point to keep in mind is the accuracy. The higher the accuracy, the better the services will be.

One of the main challenges to develop the extraction of speaker characteristics "on-the-fly" with high accuracy is related to the selection of the speech features to use and to know when a specific speaker characteristic has been extracted so that a real-time action based on the extraction of the speaker characteristic can take place. These challenges have been solved in this disclosure.

This section provides background information related to the present disclosure which is not necessarily prior art.

SUMMARY

This section provides a general summary of the disclosure, and is not a comprehensive disclosure of its full scope or all of its features.

In one aspect, a computer-implemented method is provided for profiling an unknown speaker, such that a profile for a speaker includes a set of speaker characteristics. The method includes: receiving a speech signal from an unknown speaker, where the speech signal is comprised of a plurality of data frames; for each speaker characteristic in the set of speaker characteristics, selecting a subset of data frames from a corresponding speech signal in the plurality of speech signals and thereby exclude other data frames in the corresponding speech signal from the subset of data frames, where the data frames in the subset of data frames contain information about the speaker characteristic of interest; and for a given speaker characteristic, generating a feature vector from the subset of selected data frames corresponding to the given speaker characteristic and predicting a value for the given speaker characteristic from the feature vector using machine learning. The speaker characteristics may include but are not limited to age, height, body mass index, gender, accent, dialect and race.

The speech signal may be captured from the unknown speaker using a microphone.

In one embodiment, selecting a subset of data frames from a speech signal is implemented using at least one classifier (e.g., a neural network) for each speaker characteristic.

Similarly, predicting a value for the given speaker characteristic may be implemented using a neural network (e.g., a feed-forward artificial neural network) for each speaker characteristic.

The method may further include assessing reliability of the predicted value for the given speaker characteristic; and adding the predicted value for the given speaker characteristic to a profile for the unknown speaker when the predicted value for the given speaker characteristic is deemed reliable. In one embodiment, reliability of the predicted value for the given speaker characteristic is assessed by comparing the predicted value to a prediction interval, and deeming the predicted value reliable when the predicted value falls within the prediction interval, where the prediction interval is based on a variance of a difference between predicted values for the given speaker characteristic and true values for the given speaker characteristic.

In another aspect, a computer-implemented method is provided for profiling an unknown speaker, such that a profile for a speaker includes a set of speaker characteristics. The method includes: a) receiving a speech signal from an unknown speaker, where the speech signal is comprised of a plurality of data frames; b) accumulating data frames from the plurality of data frames in a buffer; c) generating, at a given time, a feature vector from the data frames accumulated in the data buffer; d) predicting a value for a given speaker characteristic from the feature vector using machine learning, and assessing reliability of the predicted value for the given speaker characteristic; e) adding the predicted value for the given speaker characteristic to a profile for the unknown speaker when the predicted value for the given speaker characteristic is deemed reliable; and repeating steps b)-d) when the predicted value for the given speaker characteristic is deemed unreliable.

The speech signal may be captured from the unknown speaker using a microphone.

In one embodiment, the reliability of the predicted value for the given speaker characteristic is assessed by comparing the predicted value to a prediction interval, and deeming the predicted value reliable when the predicted value falls within the prediction interval, where the prediction interval quantifies uncertainty related to the predicted value, for example based on a variance of a difference between predicted values for the given speaker characteristic and true values for the given speaker characteristic.

In another embodiment, the reliability of the predicted value for the given speaker characteristic is assessed by comparing the predicted value to a prediction interval, where the prediction interval is based on a variance of a difference between predicted values for the given speaker characteristic and true values for the given speaker characteristic; computing a weighted average using the predicted value and a previous weighted average when the predicted value falls within the prediction interval, where the previous weighted average is computed using at least one predicted value for the given speaker characteristic predicted from a feature vector generated at a time earlier than the given time; comparing the weighted average to another prediction interval; and deeming the predicted value reliable when the weighted average falls within the prediction interval.

For each speaker characteristic in the set of speaker characteristics, a value for a particular speaker characteristic is predicted from the feature vector using a corresponding neural network, where a different neural network is implemented for each speaker characteristic in the set of speaker characteristics.

The steps of accumulating data frames from the plurality of data frames in a buffer, generating a feature vector from the data frames accumulated in the data buffer, and predicting a value for each speaker characteristic in the set of speaker characteristics that is deemed unreliable are repeated until each speaker characteristic in the set of speaker characteristics is deemed reliable.

In some embodiments, the feature vector is generated from a number of data frames which varies over time.

In yet another aspect, a system is presented for profiling an unknown speaker. The system includes: a frame extractor, a feature extractor, a speaker estimator and a speaker profiler. The frame extractor is configured to receive a speech signal from an unknown speaker and accumulate data frames from the speech signal in a buffer. The feature extractor is configured to generate a feature vector from the data frames in the buffer. The speaker estimator is configured to receive the feature vector from the feature extractor and, for each speaker characteristic in the set of speaker characteristics, predict a value for a speak characteristic from the feature vector using a first set of neural networks, where the speaker estimator implements a different neural network for each speaker characteristic in the set of speaker characteristics. The speaker profiler is configured to receive the predicted values for each speaker characteristic from the speaker estimator, where the speaker profiler assesses the reliability of the predicted value for each speaker characteristic and adds the predicted value for a given speaker characteristic to a speaker profile when the predicted value for the given speaker characteristic is deemed reliable. A microphone is configured to capture the speech signal from the unknown speaker.

The system may further include a frame selector configured to receive the speech signal from the frame extractor. The frame selector selects a subset of data frames from a corresponding speech signal in the plurality of speech signals and accumulates the subset of data frames in a buffer corresponding to the speaker characteristic, thereby excluding other data frames in the corresponding speech signal from the subset of data frames, where the data frames in the subset of data frames contain information about the speaker characteristic of interest. The frame selector may select a subset of data frames from each of the plurality of speech signals using a second set of neural networks, where the frame selector implements a different neural network for each speaker characteristic in the set of speaker characteristics.

In one embodiment, the speaker profiler assesses reliability of the predicted value for a given speaker characteristic by comparing the predicted value to a prediction interval and deeming the predicted value reliable when the predicted value falls within the prediction interval, where the prediction interval quantifies uncertainty related to the predicted value.

In other embodiments, the speaker profiler assess reliability of the predicted value by comparing the predicted value to a prediction interval, where the prediction interval is based on a variance of a difference between predicted values for the given speaker characteristic and true values for the given speaker characteristic; computing a weighted average using the predict value and a previous weighted average when the predicted value falls within the prediction interval, where the previous weighted average is computed using at least one predicted value for the given speaker characteristic predicted from a feature vector generated at a time earlier than the given time; comparing the weighted average to another prediction interval; and deeming the predicted value reliable when the weighted average falls within the prediction interval.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 9:
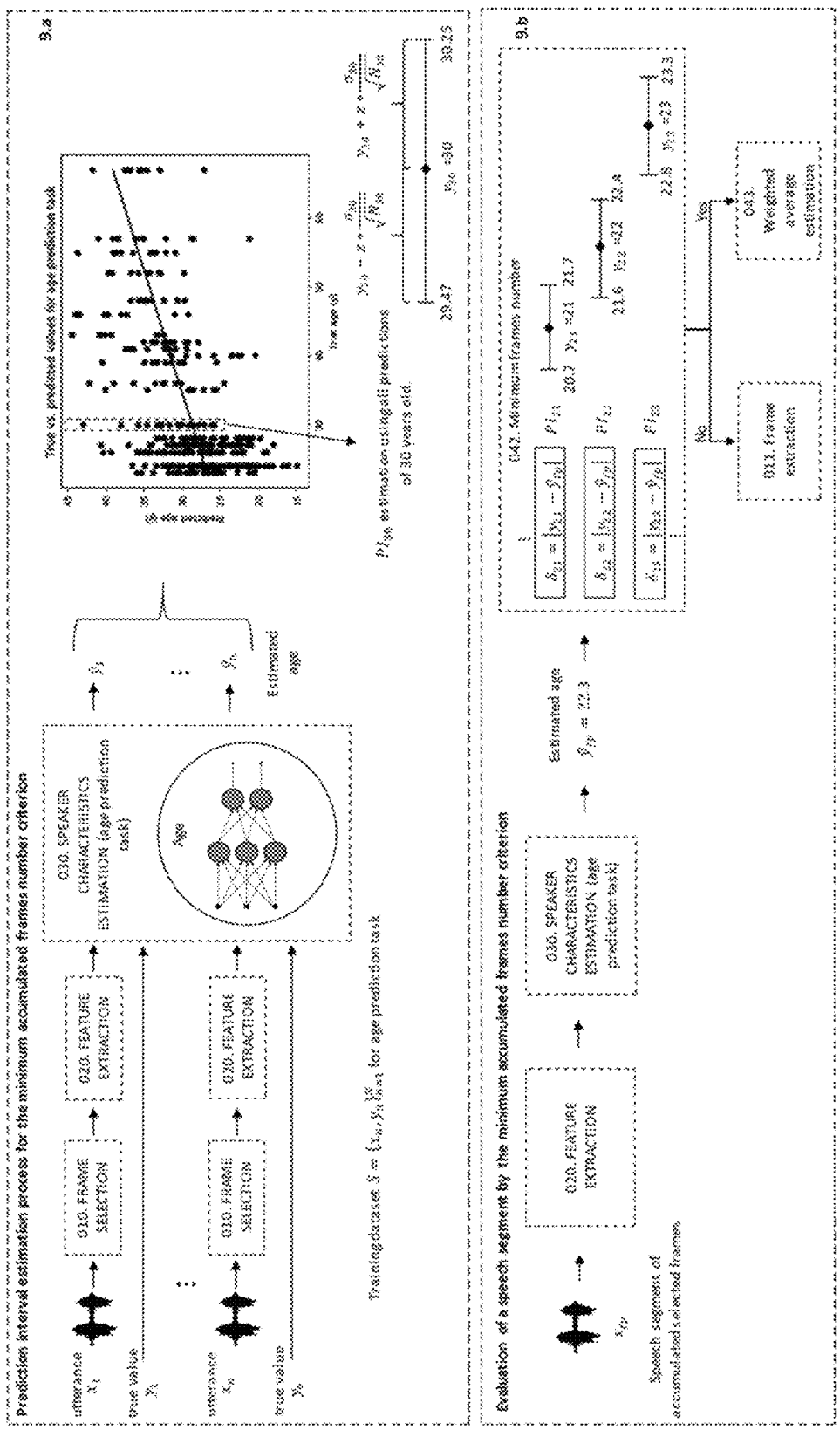

FIG. 9 is a diagram illustrating how the prediction interval (PI) estimation used for determining the minimum number of accumulated frames is estimated at training time and how the test phase is conducted, including how the prediction interval (PI) estimation process is based on the variance of the difference between the true value and the predicted values (top) and how the evaluation of a speech segment of accumulated selected frames at time t by the minimum accumulated frame number criterion (bottom).

FIG. 10 shows the standard Normal z-table for two-tailed probabilities, where the table represents the area or percentage under the standard normal curve corresponding to any z-score.

Figure 11:
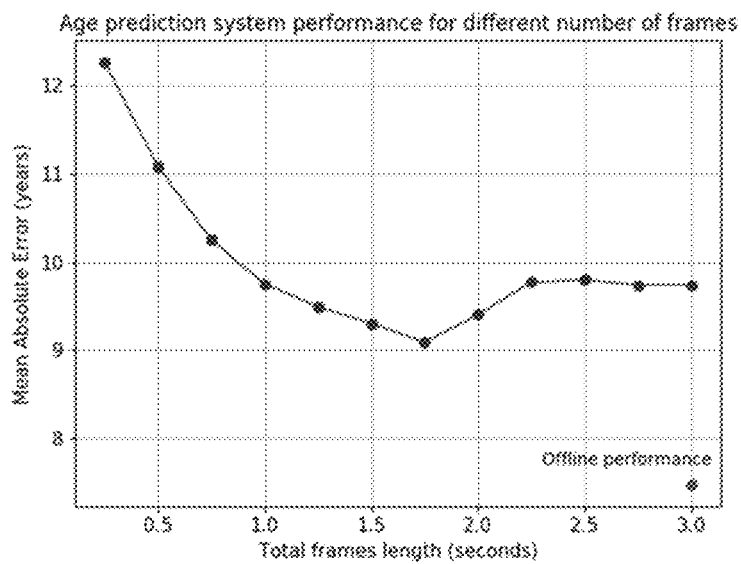

FIG. 11 is a graph showing the age prediction system performance as a function of the number of available frames.

Figure 12:
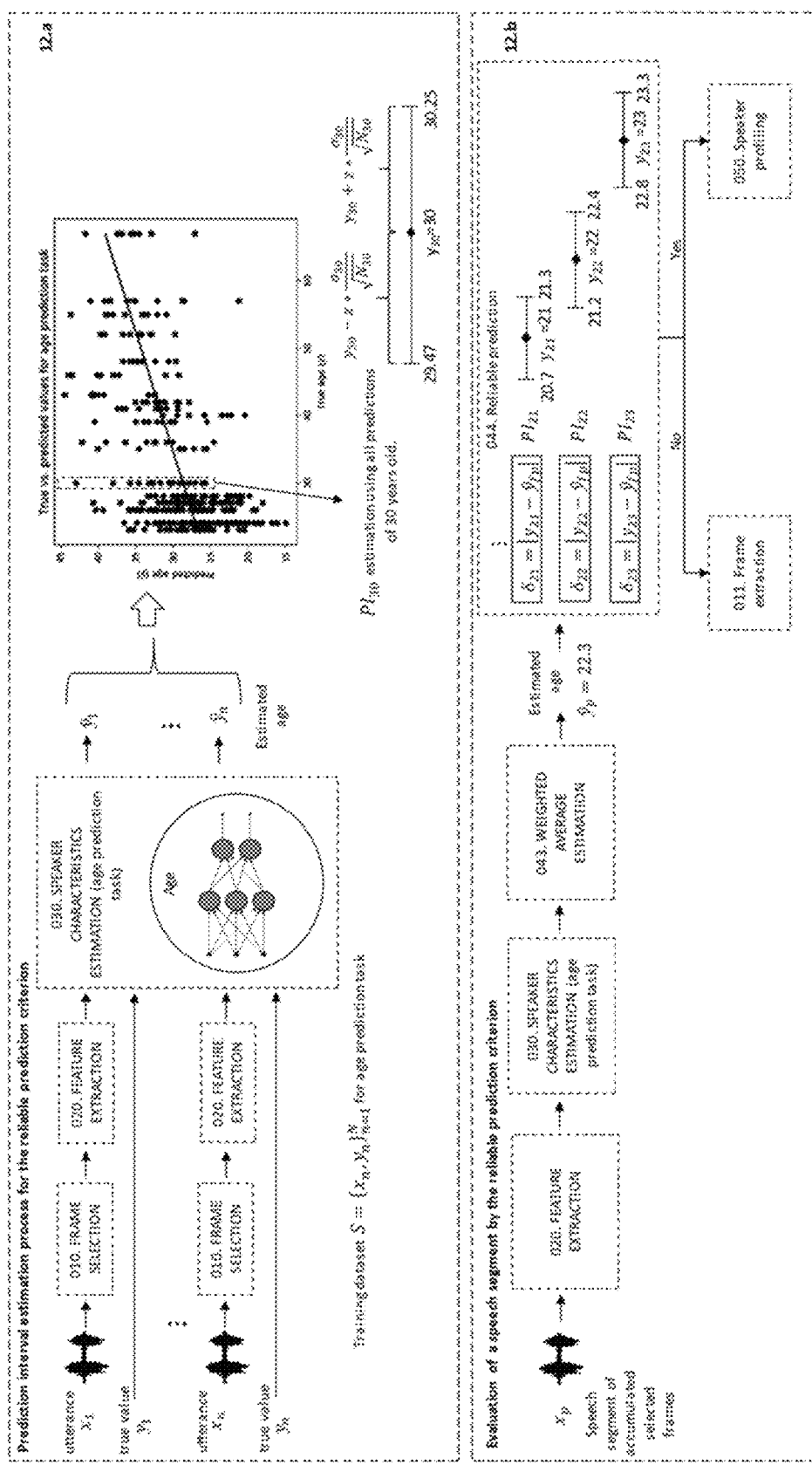

FIG. 12 is a diagram illustrating the prediction interval (PI) estimation for the reliable prediction criterion and the evaluation of a speech segment by the aforementioned criterion, where the prediction interval (PI) process is based on the variance of the difference between the true value and the predicted values (top) and the evaluation of the reliable prediction criterion (bottom).

Figure 13:
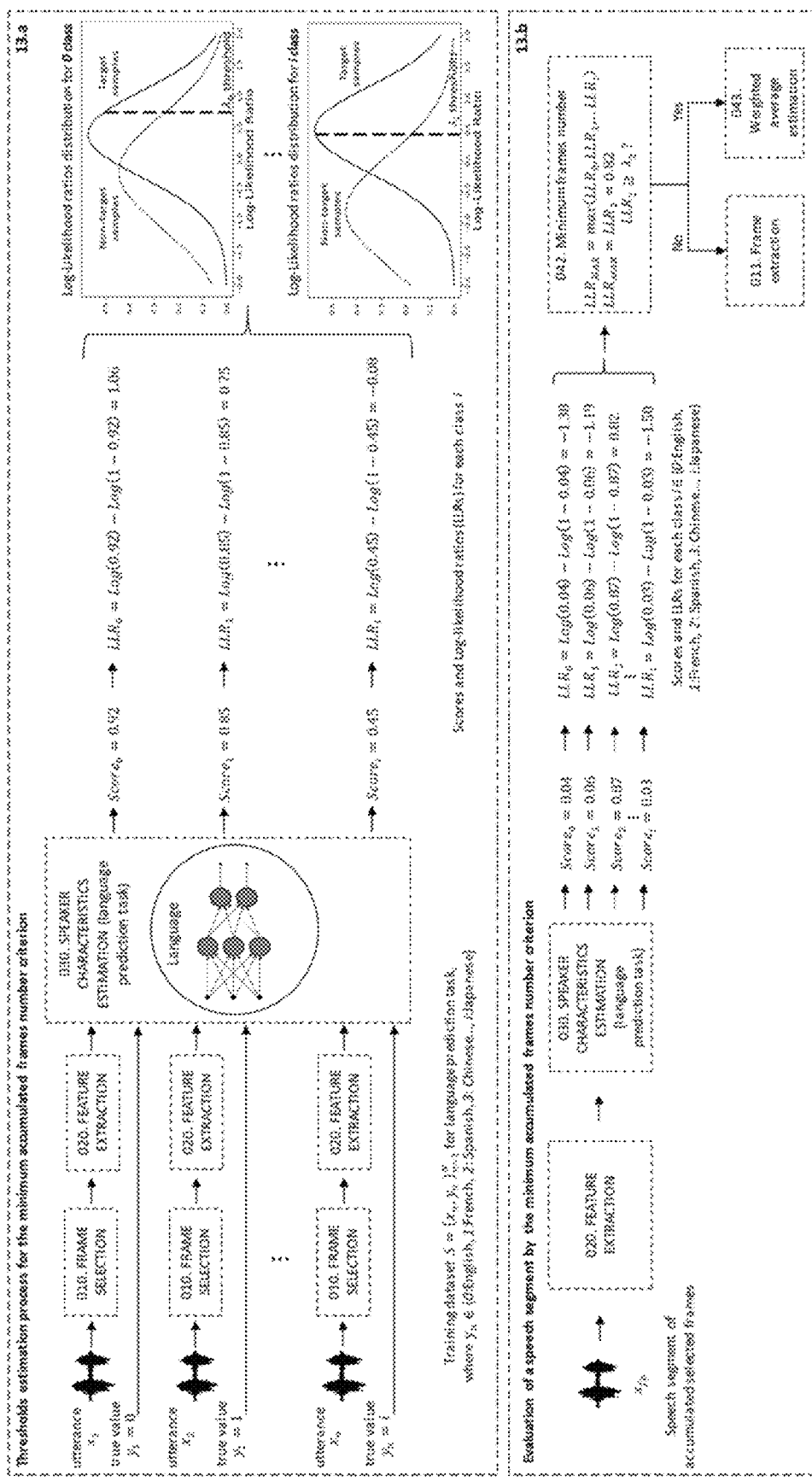

FIG. 13 is a diagram illustrating the threshold's estimation for each class from Log-Likelihood Ratios (LLRs) for speaker characteristics with categorical values and the minimum number of frames criterion, where the thresholds' estimation is based on the LLRs (top) and the evaluation of the minimum number of frames criterion during the test phase (bottom).

Figure 14:
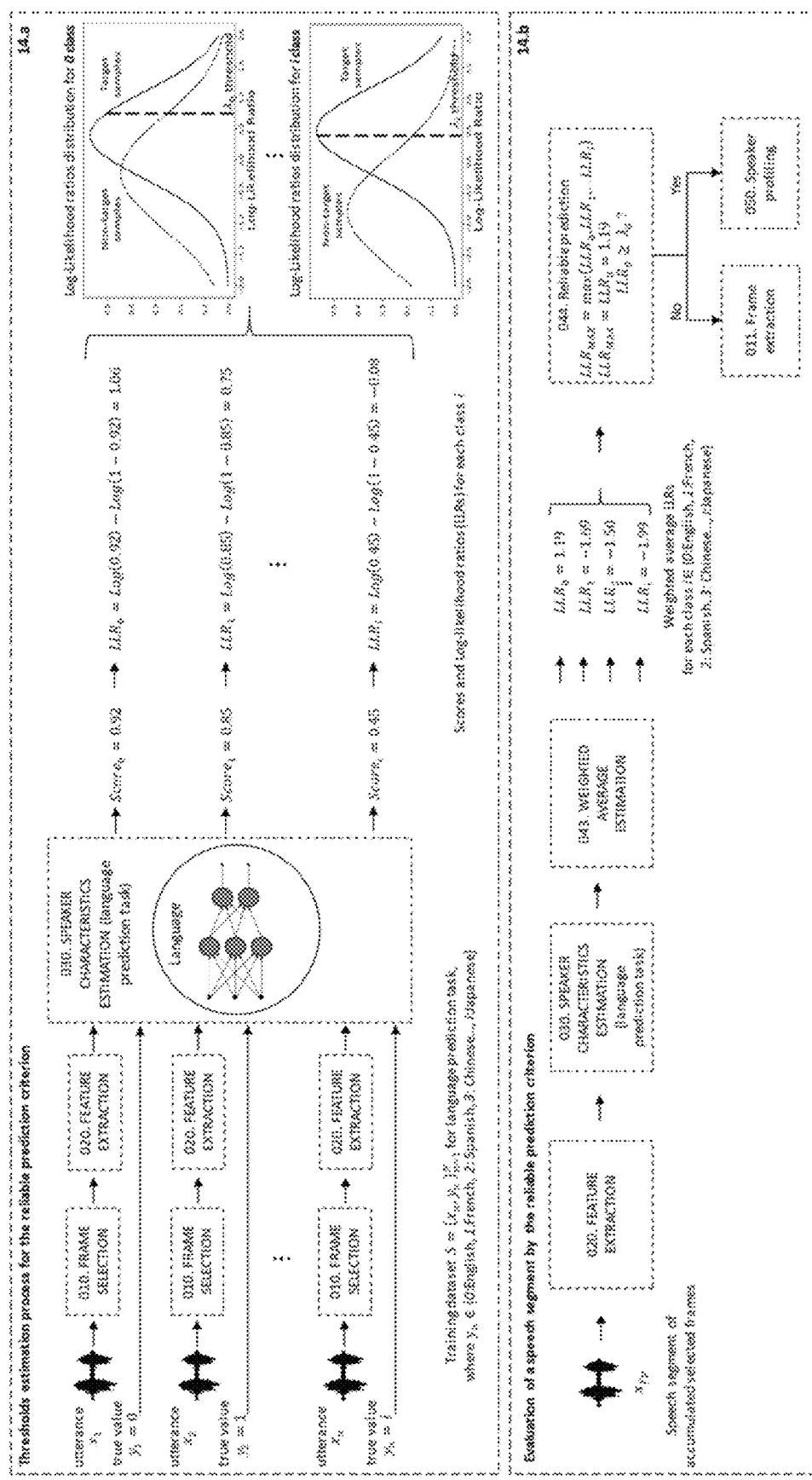

FIG. 14 is a diagram illustrating the threshold's estimation for each class from LLRs and the reliability prediction criterion, where the thresholds' estimation is based on the weighted average LLRs using a training dataset (top) and the evaluation of the reliable prediction criterion during the test phase (bottom).

Corresponding reference numerals indicate corresponding parts throughout the several views of the drawings.

DETAILED DESCRIPTION

Example embodiments will now be described more fully with reference to the accompanying drawings.

Figure 1:
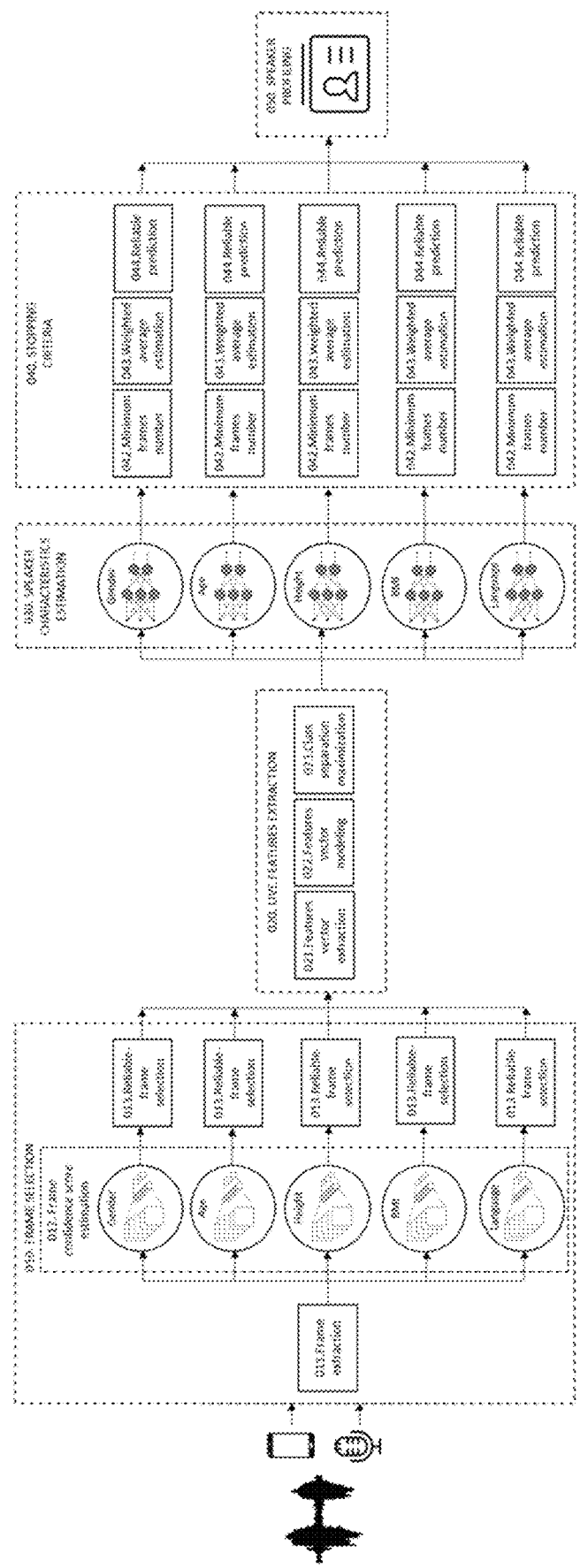
FIG. 1 is a diagram showing a proposed system for "on-the-fly" speaker characteristics estimation and user profiling.

FIG. 1 shows the general system to estimate 'on-the-fly' speaker characteristics and user profiling. In a nutshell, the speaker characteristics prediction is performed at each time t. The system will estimate those characteristics using a segment of N selected frames accumulated at a time t. As a result, the speaker characteristics estimation is performed in real time (or nearly real-time).

The system follows a novel approach for speaker characteristics prediction. It performs the predictions using short-term cepstral features modeling, that is cepstral vectors representing the spectral content of speech window modeled through a generative model such as Gaussian Mixture Model (GMM), and a DNN-based prediction model. As mentioned, the unique capabilities of the disclosure as compared to prior art systems lie in the low latency and high accuracy of the speaker characteristics extraction process.

The disclosure includes a frame selection module 010, which is one novel component of the disclosure, contributing to the high accuracy and low latency, a feature extraction module 020, a speaker characteristics estimation module 030 based on DNNs, and a novel stopping decision criteria 040 to provide accurate predictions of speaker characteristics. As used herein, the term module may refer to, be part of, or include an Application Specific Integrated Circuit (ASIC), an electronic circuit, a computer processor that execute one or more software or firmware programs, a combinational logic circuit, and/or other suitable components that provide the described functionality.

Figure 2:
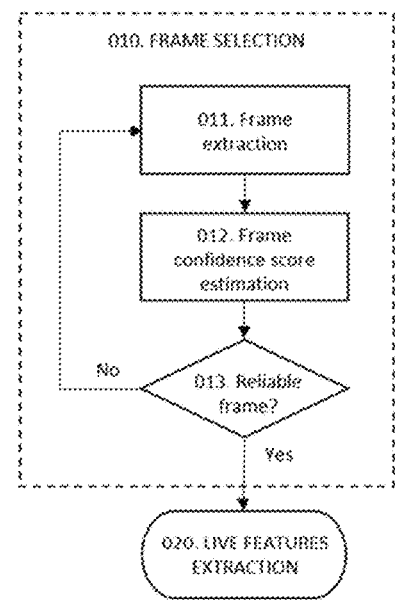
FIG. 2 is a diagram explaining the frame selection; the diagram covers the steps from when a live speech signal is received to the one when a frame has been selected or not for each characteristic.

FIG. 2 shows the frame selection 010 workflow. For each specific characteristic, the frame selection module 010 aims at filtering frames which do not contain relevant information to extract the specific speaker characteristic. As a result, the frames containing very little information to identify a specific user characteristic will be eliminated and not be processed. This frame selection process contributes to a faster convergence towards identifying a specific speaker characteristic. Another consequence of processing only relevant frames is an improvement in the accuracy of the speaker characteristics prediction.

The frame selection module 010 consists of three sub-modules: frame extraction 011, frame confidence score estimation 012, and reliable-frame criterion 013. In the example embodiment, the voice is collected at frame level by means of an independent microphone or one embedded in an electronic device.

For frame confidence score estimation 012, the confidence scores are calculated for each frame. This confidence score will be used to select the most suitable frames to predict speaker characteristics. In one embodiment, this block is designed with several DNN-based classifiers in parallel. For example, one classifier is implemented per speaker characteristic. Every classifier may be a Convolutional Neural Networks (CNNs) implementation.

Figure 3:
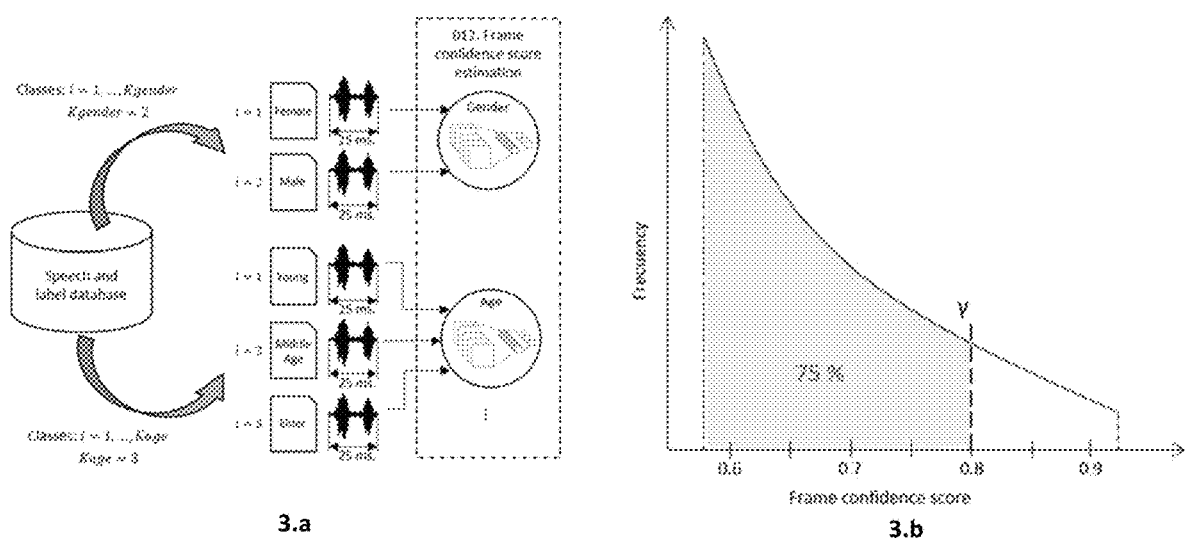
FIG. 3A is a diagram showing the training data used for the frame selection process and a module to select a threshold for reliable-frame criterion, where the training data is used as input for each DNN-based classifier.
FIG. 3B is a graph depicting an example of frame confidence score distribution for the age characteristic to calculate the threshold for the reliable-frame selection criterion.

FIG. 3 explains how the classifiers are trained and the probabilities of each class, i.e. confidence scores, are obtained.

FIG. 3 on the left shows the training data provided as input to each DNN-based classifier. Each classifier is trained with the speech frames labeled for a specific characteristic. In this example, gender and age are the speaker characteristics used.

The training dataset consists of voice samples and its associated labels per characteristic. Voice samples, which have a duration of 25 ms, are raw speech data to which a Hamming window is applied with a shift of 10 ms to obtain the next frame at the subsequent iteration.

The labels corresponding to the characteristics expressed as numerical values, e.g., age, height and BMI, are mapped to a number of classes per characteristic, $K_{characteristic}$. Each $K_{characteristic}$ value will be chosen according to the required levels of granularity.

For the labels corresponding to categorical values (e.g., gender and language), the number of classes, $K_{characteristic}$, will depend on the number of classes which are in the database. For example, $K_{language}$ value will depend on the number of languages represented in the database.

FIG. 3 includes example K values for gender and age. In case of gender, $K_{gender}=2$ is used to classify male speech and female speech. In case of age, $K_{age}=3$ is defined after deciding to classify the age in the classes: youngs, middle-age and elders. The same process would apply to the remaining characteristics of interest.

Throughout the training process a class balanced database is used to train appropriately every class for each characteristic.

In the example embodiment, the architecture of the classifiers is the same for all the characteristics. It is composed of several filter stages followed by a classification stage. The initial filter stages are also known as feature extraction phases. The architecture consists of convolutional layers, max-pooling layers, and non-linear activation functions. The classification stage consists of a fully-connected layer and a softmax layer. The softmax layer is used to represent the probability distribution of each class i for each frame x, p(i|x).

More specifically, the softmax function is as follows:

$$\sigma(z)_i = \frac{e^{z_i}}{\sum_{j=1}^{K} e^{z_j}}$$

$$i = 1, \ldots, K; z - (z_1, \ldots, z_K) \in \mathbb{R}^K$$

where the standard exponential function is applied to each element $z_i$ of the vector z. The values $\sigma(z)_i$, which represent the probabilities for each class, are normalized to ensure that the classifier outputs are between 0 and 1. The sum of the components $\sigma(z)$ is 1. The probabilities of the classes represent the confidence scores of those classes.

Once the classifiers are trained, the confidence scores are provided as input to the reliable frame selection module 013. In one example embodiment, each characteristic classifier has a specific threshold associated ($\gamma_{characteristic}$). It is used to determine when a frame is reliable.

To determine the threshold for a specific characteristic, first run the previous classification step for a specific dataset using the frame confidence score estimation module. Then, use the classification outputs, i.e. confidence scores, to calculate the confidence score distribution.

FIG. 3 on the right depicts an example of a frame confidence score distribution for the age characteristic. Only the correctly classified frames, i.e. when the most probable class is the right class, are used according to the label in the dataset. The distribution is used to determine the threshold as the reliable-frame criterion 013. In one example, a third quartile $Q_3$ criterion is used to define the threshold.

Third quartile is also known as the 75th percentile. The result is a value under which we found the 75% of the correctly classified samples of the distribution. This value will be considered the threshold. In this example, the threshold $\gamma_{age}$, is 0.8. For future input frames when the confidence score will be greater than $\gamma_{age}$, the classification is considered to be correct. This process will be carried out for all the characteristics of interest (e.g., gender, height, BMI, language).

During the test process for each characteristic, the system will select the frames that are relevant for the characteristic of interest based on the reliable-frame selection criterion 013. Each input frame will be evaluated for each characteristic as a reliable frame or not.

Figure 4:
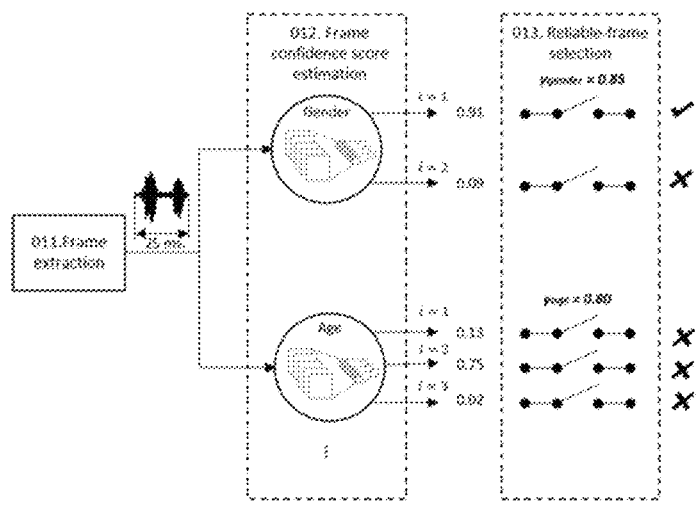
FIG. 4 is a diagram showing an example of the test process at the end of the frame selection module.

FIG. 4 shows an example of the test process for gender and age. One frame will get different confidence scores depending on the characteristic. In the example shown, for the gender characteristic the most probable class gets a confidence score of 0.91 (corresponding to class i=1 or "Female"). For the age characteristic, the most probable class gets a confidence score of 0.75 for the class i=2 ("Middle Age").

If one assumes that the threshold for gender $\gamma_{gender}=0.85$ and the threshold for age $\gamma_{age}=0.80$, the input frame is considered to be reliable for gender, but not for age since its associated confidence is lower than the age threshold.

The above explanation illustrates that one frame can be more representative of a specific characteristic as compared to others. This mechanism contributes to reducing the latency as some characteristics will be predicted before others because a sufficient number of frames have been selected allowing a reliable characteristic to be extracted. In other words, all the speaker characteristics are not extracted at the same time.

After the frame selection module 010, selected frames are accumulated in a buffer into a speech segment at time t, and this segment feeds the live feature extraction module 020.

Figure 5:
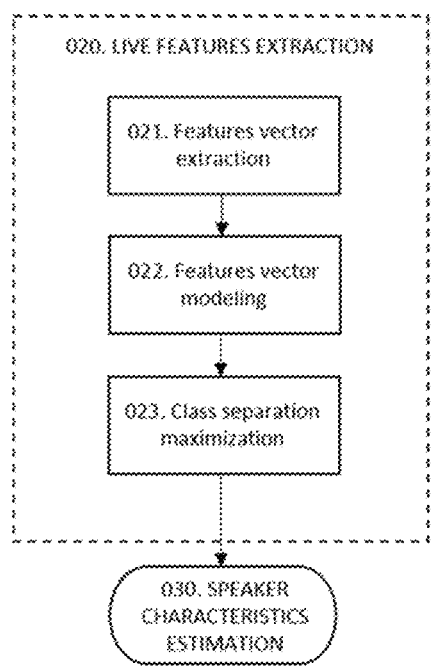
FIG. 5 is a diagram explaining the live feature extraction workflow from the first step when a vector of coefficients has been extracted to the last one when the vector is ready to be used by the speaker characteristics estimation module.

FIG. 5 shows the live feature extraction module 020 workflow. The live feature extraction module 020 consists of three sub-modules: feature vector extraction 021, feature vector modeling 022, and class separation maximization 023.

For feature vector extraction 021, 40-dimensional Mel Cepstrum coefficients (MFCCs) vectors are used in an example embodiment. Hamming windows (e.g., 25 ms) are slided by 10 ms at each iteration. Then a Cepstral Mean Variance Normalization (CMVN) is applied. It should be noted that other types of feature vector (e.g., Linear Predictive Coding, Cepstrum coefficients or Fast Fourier Transform coefficients) can be used.

For features vector modeling 022, an i-vector extractor module based on a gender-independent UBM-GMM of 512 components is used with a total variability subspace of dimensionality 400. It should be noted that other feature vector modeling algorithms can be used, such as DNN-based embeddings.

For class separation maximization 023, a Linear Discriminant Analysis (LDA) is used. LDA applies a dimensionality reduction to 200 components, and projects the orthogonal axes to a new space to better discriminate between different classes.

The output of the live feature extraction module 020, which are i-vectors projected in a smaller dimensional space by the LDA, is used as input to the speaker characteristics estimation module 030.

The speaker characteristics estimation module 030 is designed with several DNN-based models in parallel. In an example embodiment, one model per speaker characteristic, e.g., gender, age, height, BMI, language, is implemented. Every model consists of a four layer, fully-connected DNN.

Figure 6:
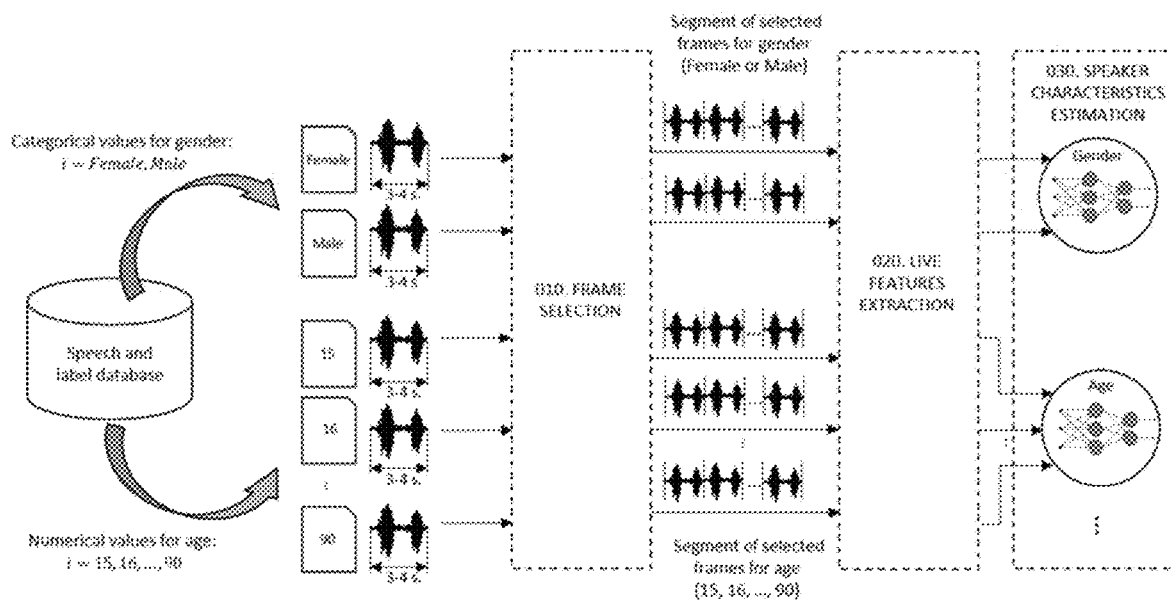
FIG. 6 is a diagram showing the training data as input for each DNN-based classifier, along with different values or classes used for each characteristic.

FIG. 6 shows the training data used in the training process. In this example, gender and age are the speaker characteristics used.

The training dataset consists of voice samples and its associated labels per characteristic. Voice samples are raw speech utterances. Every speech utterance has a duration around 3 or 4 s., but it could be different depending on the training dataset.

The labels are expressed with numerical values for characteristics, such as age, height and BMI, and categorical values for characteristics such as gender and language.

FIG. 6 shows an example of the training stage for categorical values (i.e. gender) and numerical values (i.e. age). For gender (categorical value), utterances are classified in two classes: male and female. For age (numerical value), N values are used as classes. These values correspond to ages in the database, in this example ages between 15 and 90 years old are used. The same method would apply to the remaining characteristics of interest.

Throughout the training process a class-balanced database is used to properly train every class for each characteristic. The training process includes the frame selection 010, feature extraction 020, and the speaker characteristics estimation 030 modules. During the training stage, speech utterances of 3-4 s are used as input to the frame selection module 010. As output, a segment of selected accumulated frames is provided. Feature extraction 020 is performed on the speech segment. The extracted feature vectors along with their labels corresponding to each speaker characteristics are used to train each DNN-based model in the speaker characteristic estimation module 030.

In one example, the DNN architecture consists of four fully-connected layers. The two hidden layers have 256 units and a hyperbolic tangent (tan h) activation function each. More specifically, the tan h function is defined as follows:

$$\tanh(z) = \frac{2}{1+e^{-2z}}$$

The output layer consists of N units and an activation function. The number of units N and the activation function in the output layer depend on each characteristic.

In case of characteristics expressed as categorical values (e.g., gender and language), the output layer consists of a layer with N units, where N is the number of classes of the characteristic of interest. For instance, for gender one can use N=2 corresponding to female and male speech; for language, N is equal to the number of languages trained in the DNN. Finally, the activation function for these characteristics is a softmax function.

In case of characteristics expressed as numerical values (e.g., age, height and BMI), the output layer consists of a single unit which does the prediction. The activation function for these characteristics is a linear function.

More specifically, the linear function is defined as follows:

$$f(z)=az+b$$

where the value of f(z) increases proportionally with the value of z. The weight is represented by a, and b is the bias.

It should be noted that other DNN architectures can be used, e.g., Recurrent Neural Network (RNN) or Convolutional Neural Networks (CNNs).

Figure 7:
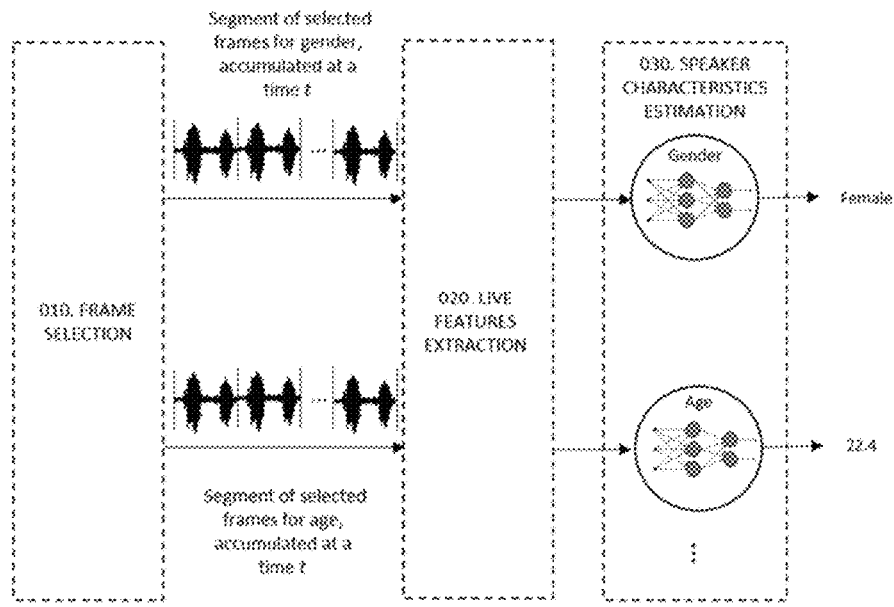
FIG. 7 is a diagram showing an example of the test process for the gender and age characteristics.

FIG. 7 shows an example of the test process for gender and age. Starting with selected frames in 010, a segment is progressively assembled with the accumulated frames at time t and it is processed by the live feature extraction module 020. Finally, the speaker characteristics estimation module 030 is applied.

In this example, the frames have been selected for both gender and age. Thus, speaker characteristics estimation module 030 gets a value for each characteristic for the segment of selected frames at time t. As it has been mentioned before, some characteristics are expressed as numerical values (e.g., age, height and BMI) and the other ones as categorical values (e.g., gender and language). In the example shown in the figure, the outputs are: "Female" for gender and "22.4" for age.

The speaker characteristics prediction module 030 produces estimations that are then provided to the stopping criteria module 040. The stopping criteria module 040 includes a set of methods to decide if the speaker characteristics predictions (e.g., age, height, gender, language, BMI), obtained from the speech segment of relevant accumulated frames at time t by the module 030, are reliable enough to provide an accurate estimation.

Figure 8:
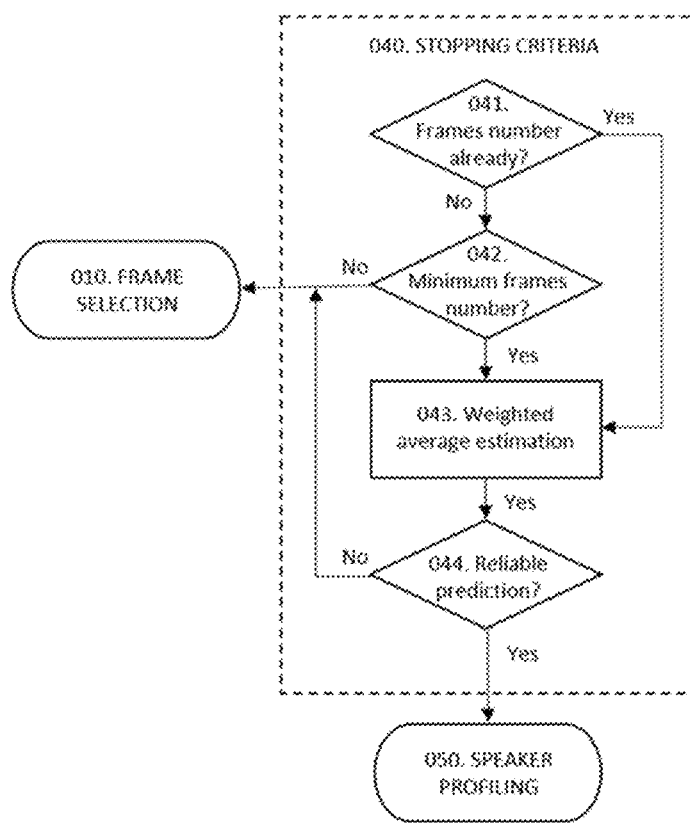
FIG. 8 is a diagram showing the workflow for the stopping criteria from the first step, when a minimum number of frames criterion has to be satisfied to the last step when a reliable prediction is provided for each characteristic.

FIG. 8 shows the stopping criteria 040 workflow. The stopping criteria module 040 consists of three sub-modules: minimum accumulated frames number criterion 042, weighted average estimation 043, and reliable prediction criterion 044.

Different methods could be applied for the stopping criteria, according to the type of speaker characteristics. In case of characteristics expressed as numerical values, Prediction Intervals (PIs) are used. For the categorical values, the criteria are based on the Log-likelihood ratios (LLRs). It should be noted that for both methods, PIs or LLRs are used for both the minimum accumulated frames number criterion 042 and the reliable prediction criterion 044.

For characteristics expressed as numerical values (e.g., age, height and BMI), the stopping criteria module 040 makes use of Prediction Intervals (PIs) estimated at training time. The PIs represent the variance of the characteristics prediction error; that is, the difference between the predicted and true values of the speaker characteristics. For instance, at a time t, first, the incoming frames, that were selected as relevant for a given characteristic in 010, are evaluated by the minimum accumulated frames number criterion 042. If the criterion is satisfied, then predictions from the following selected frames are accumulated using the weighted average estimation 043. Then, the reliability of the prediction is assessed. It is important to point out that these criteria are matched with each speaker characteristic.

For the minimum accumulated frames number criterion 042, as the first speech frames may present poor speaker-characteristics information, i.e. they may not all be reliable for the estimation of speaker characteristics, one can estimate a minimum number of accumulated frames via the minimum accumulated frames criterion to avoid providing estimations which would not be accurate enough.

The minimum accumulated frames number criterion 042 is based on the prediction interval (PI) estimation. In the context of the speaker characteristics prediction task, different PIs will be obtained for each value belonging to each speaker characteristic. The prediction interval (PI) is defined as the quantification of the uncertainty on a prediction. This quantification is based on the variance of the differences between the predicted values and the true values. As a result, it will provide a probabilistic upper and lower bounds that contains, with a specified degree of confidence, a future randomly selected observation from a distribution.

Before the evaluation of the minimum accumulated frames number criterion 042, the PIs must be estimated at training time. The PI estimation process consists of estimating each speaker characteristics from a training dataset, and then obtaining the PIs estimation associated to each characteristic.

FIG. 9 on the top depicts the prediction interval estimation process for the minimum accumulated frames criterion for the age prediction task. The predictions, corresponding to a specific true speaker characteristic value, are used to estimate the PI for that true value. For the interval prediction (PI) estimation, one can use a training dataset S containing N speech utterances with their respective speaker characteristics information (e.g., age, height, BMI). The dataset can be defined as follows:

$$S = \{x_n, y_n^{characteristic}\}_{n=1}^{N}$$

where $x_n$ denotes the speech utterances of 3-4 seconds duration and $y_n^{characteristic}$ denotes the corresponding true values or classes of the speaker characteristic (e.g., age, height, BMI, weight). The predicted characteristic values $\hat{y}_n$ obtained by the speaker characteristics estimation module 030 from the speech utterances $x_n$ along with their respective speaker characteristics values (e.g., age, height, BMI, weight) are used to estimate the prediction intervals (PIs). All predictions ($N_c$ predictions) corresponding to that true value obtained by the speaker characteristics estimation module 030, are used to calculate the variance of the difference between the true value and the predicted values. The variance $\sigma_c$ can be defined as follows:

$$\sigma_c = \frac{1}{N_c} \sum_{n=1}^{N_c} (y_c - \hat{y}_n)^2$$

FIG. 10 shows the Standard Normal z-table for two-tailed probabilities. It represents the area or percentage under the standard normal curve corresponding to any z-score. That is, the probability of observing a z-value that is within the given ±z-score. For instance, the aforementioned probability for a z=1.44 (i.e. tenths=1.4 and hundredths=0.04 in FIG. 10), is 85.01% (i.e 1−0.14987).

Assuming that the variance of difference between the true and the predicted values $\sigma_c$ shows a normal distribution, the interval of uncertainty for a specific true value can be calculated as follows:

$$\text{interval}_c = z * \frac{\sigma_c}{\sqrt{N_c}}$$

where the z value is provided by the standard normal distribution table in FIG. 10. The PI around the true value $y_c$ can be calculated as follows:

$$PI_c = y_c \pm \text{interval}_c$$

For the minimum number of accumulated frames criterion 042, the characteristic prediction from the speech segment of accumulated selected frames, obtained via the speaker characteristics estimation module 030, must be between the PI bounds at a probability determined by the z value.

FIG. 9 shows the prediction interval estimation process for the age prediction task. In this example, the predicted age values had to be between the PI bounds at 85% probability, where z value is 1.44.

Once the criterion's condition is satisfied in 041 at time t, the prediction is calculated by means of a weighted average estimation 043. Thus, the following speech frames at time t+1, t+2, t+3, . . . are no longer evaluated by the minimum number of accumulated frames criterion 042 since it was already satisfied in 041.

FIG. 9 on the bottom represents the evaluation of a speech segment of accumulated selected frames at a time t by the minimum accumulated frames number criterion 042 for the age prediction task. During the evaluation of the speech segment, once the predicted age $\hat{y}_{fp}$ from the first accumulated selected speech frames at time t was obtained by means of the speaker characteristics estimation module 030, first a PI must be selected. This is performed by finding the minimum absolute difference δ between the true age $y_c$ and the predicted age $\hat{y}_{fp}$. The difference is defined as follows:

$$\delta = |y_c - \hat{y}_{fp}|$$

Once the PI is selected, the minimum accumulated frames number criterion 042 is satisfied if the PI contains the predicted age.

For instance, for a predicted age value $\hat{y}_{fp}=22.3$ of a speech segment, the selected PI which corresponds to a minimum $\delta_c$ is $PI_{22}$. Since the predicted age of the first accumulated frames $\hat{y}_{fp}=22.3$ is between the bounds of the $PI_{22}$ that PI is selected and the prediction is calculated by means of a weighted average estimation 043. Thus, the following speech frames at time t+1, t+2, t+3, . . . are no longer evaluated by the minimum number of accumulated frames criterion. It must be noted that z-value can be used as a parameter to constrain the prediction interval. Thus, if we desire a more conservative system, we must choose a smaller z-value.

For a predicted age value $\hat{y}_{fp}=22.6$ of a speech segment, the selected PI which corresponds to a minimum $\delta_c$ is $PI_{22}$, however the predicted value is not between $PI_{22}$ bounds. Thus, the minimum accumulated frames number criterion 042 is not satisfied, then the process continues to the frame extraction module 011.

It should be noted that there is a chance that the predicted value is contained in two PIs. For instance, a predicted age value $\hat{y}_{fp}=21.5$ of a speech segment is contained in $PI_{21}$ and $PI_{22}$. In an example embodiment, if that is the case, the final PI will correspond with the lower one, that is the $PI_{21}$. Other solutions could be adopted such as selecting the PI corresponding to the higher age value or the PI which corresponds to the lowest interval. Furthermore, to eliminate false alarms (meaning dealing with estimated values which has quite far from the true age value) a more conservative approach can be used by setting a smaller z-value.

In the example embodiment, a weighted average method is applied by the weighted average estimation module 043 to avoid that outlier values resulting from the estimation of the characteristics degrade the system's performance.

FIG. 11 shows the system performance for the age prediction task. It is shown that the greater number of frames, the better the prediction (lower Mean Absolute Error) is and ultimately get close to the offline performance. However, there is a chance that the coming frames at t+1, t+2, t+3, . . . could degrade the predicted value at time t due, for example, to an error in the frame selection.

To avoid this issue, one can use a weighted average making use of the frame at time t and the accumulated frames at time t−1.

The predict value V at time t is defined as follows:

$$V_t = \beta V_{t-1} + (1-\beta)S_t, \beta \in [0,1]$$

where $s_t$ is the predicted value at current time t and $v_{t-1}$ is the previous weighted value at time t−1, and β works as a hyperparameter which weights last accumulated values and the current predicted value. Since the more frames available, the better prediction, the chosen value for β is 0.9. This way, the estimation from previous frames have a higher weight in the final decision. This approach is based on the Stochastic Gradient Descendent (SDG) method with momentum used in DNNs training. Nevertheless, the β values could be tuned as necessary for each use case or application.

The reliable prediction criterion 044, is similar to the minimum number of accumulated frames criterion. It evaluates if the prediction from accumulated frames at time t, provided by the weighted average estimation 043, is reliable enough to be provided as the final estimation of the speaker characteristic with a certain confidence. If the criterion is satisfied, no more speech frames are processed and the speaker characteristic estimation is used and included in the speaker profile by means of speaker profiling module 050.

The reliable prediction criterion 044 is based on both the prediction interval (PI) estimation and the PI bounds definition at a probability determined by the z value as performed for the minimum accumulated frames number criterion 042.

FIG. 12 on the top depicts the prediction interval (PI) estimation process for the reliable prediction criterion for the age prediction task. In this case, the criterion is that predicted age values must be between the PI bounds at 60% probability, where z value is 0.84.

FIG. 12 on the bottom represents the evaluation of a speech segment of accumulated selected frames at a time t by the reliable prediction criterion 044 for the age prediction task. The evaluation method is similar to the one performed for the minimum accumulated frames number criterion 042.

Once the criterion's condition is satisfied, the prediction calculated by the weighted average estimation 043 is provided as a final estimation. The final result is used by the module 050 to create a speaker profile.

In case of speaker characteristics expressed as categorical values (e.g., gender, dialect, language), the stopping criteria module makes use of Log-Likelihood Ratios (LLRs), instead of PIs. LLRs are estimated at training time.

Given a segment of selected speech frames of an unknown speaker, the classification model will provide a decision whether it is likely or not that the predicted class (e.g., English or Chinese for the language speaker characteristics) can be included in the speaker profile. For speaker characteristics expressed as categorical values, the prediction task can be restated as a basic hypothesis test between a null-hypothesis ($H_0$) that the predicted class does not correspond to a given speaker characteristic and an alternative hypothesis ($H_1$) that the predicted class corresponds to the speaker characteristic. In a mathematical form, the problem can be defined by means of a Log-Likelihood Ratio (LLR) between the likelihoods obtained for the null-hypothesis ($H_0$) and the alternative hypothesis ($H_1$), as shown in the following equation:

$$LLR_i = \text{Log } P(X|H_{i1}) - \text{Log } P(X|H_{i0})$$

$$LLR_i \begin{cases} \geq \lambda_i \text{ accept } H_{i1} \\ < \lambda_i \text{ reject } H_{i1} \end{cases}$$

where $P(X|H_{ij})$, i=0,1,2, . . . M class, j=0,1, is the probability or score for the hypothesis $H_{ij}$ evaluated for the observed X segment of selected speech frames of an unseen speaker (also referred to likelihood), and $\lambda_i$ is the decision threshold for accepting or rejecting the class i hypothesis. The higher the LLR is, the greater is the confidence that it is the correct class. As shown in FIG. 13. and FIG. 14, for the class i and $P(X|H_{i1})$, the log-likelihood of the null-hypothesis is calculated using the equation $\text{Log}(1-P(X|H_{i1}))$.

FIG. 8 shows the stopping criteria 040 workflow, which is used for both speaker characteristics with numerical values and speaker characteristics with categorical values.

The minimum accumulated frames number criterion 042 for characteristics expressed as categorical values is based on the decision thresholds estimated from the distribution of LLRs of each class. Different decision thresholds $\lambda_i$ will be obtained for each class i belonging to each speaker characteristic. These thresholds will decide if the alternative hypothesis ($H_{i1}$) of the class i is accepted or rejected.

Before the evaluation of the minimum accumulated frames number criterion 042, the decision thresholds must be estimated at training time. To determine the decision thresholds for each class of a specific characteristic, first calculate the LLRs from the scores obtained by the module 030 for a specific class. Then, a decision threshold for each class is determined from the LLR distributions.

FIG. 13 on the top depicts the decision threshold estimation process for the minimum accumulated frames criterion for the language prediction task. Different decision thresholds are estimated for each class. From the scores obtained by the speaker characteristics estimation module 030 LLRs are calculated. From the LLR distributions corresponding to the true class and the other possible classes, the decision threshold A is estimated. The selected threshold will determine if we want the model to yield acceptance (score higher than the threshold) or rejection (score lower than the threshold) for every test speech segment. Two type of errors can occur: false alarm (or false acceptance), if the LLR is higher than the threshold for a non-target sample, and non-detection (or false rejection) if the LLR is lower than the threshold for a target sample. Therefore, as the LLR distributions overlap, whatever the detection threshold is, a percentage of false acceptances and false rejections will occur. The higher the threshold is, the lower the false alarms and the higher the false rejections will be. Thus, the decision threshold chosen (in most case manually) constitutes a tradeoff between the false positives and the false negative rates of the system.

For the decision threshold estimation, one can use a training dataset S containing N speech utterances with their respective speaker characteristics information, e.g., language, gender. The dataset can be defined as follows:

$$S=\{x_n, y_n^{characteristic}\}_{n=1}^N$$

where $x_n$ denotes the speech utterances of 3-4 seconds duration and $y_n^{characteristic}$ denotes the corresponding true values of the speaker characteristic classes. The scores of predicted characteristic values $\hat{y}_n$ obtained from the module 030 and the speech utterances $x_n$ are used to calculate LLRs. From the distributions of LLRs for each class, a decision threshold $\lambda$ is set based on the tradeoff chosen between the false positive and false negative rates.

For the minimum number of accumulated frames criterion 042, one can make sure that the maximum LLR, which corresponds to LLR, of the most likely class i, must be greater than the decision threshold $\lambda_i$, i.e. the threshold associated to the most likely class.

FIG. 13 on the bottom represents the evaluation of a speech segment of accumulated selected frames at a time t by the minimum accumulated frames number criterion 042 for the language prediction task. During the evaluation of the test speech segment, LLRs are calculated from the scores obtained for each class. Then, the maximum LLR value, which corresponds to the most likely class, is selected. The maximum LLR value is compared to the decision threshold of the most likely class. The minimum accumulated frames number criterion 042 is satisfied if there is only one maximum LLR value that is greater than the decision threshold of the most likely class.

For instance, in case of the language prediction task, the predicted language class is Spanish with an LLR of 0.82. If the decision threshold for the Spanish class is 0.55, then the LLR for the Spanish class (which is the maximum LLR) is greater than the decision threshold. As the 042 condition is satisfied, the LLR is accumulated by means of a weighted average estimation 043. Thus, the following speech frames at time t+1, t+2, t+3, . . . are no longer evaluated by the minimum number of accumulated frames criterion 042 since it was already satisfied in 041.

In case there is more than one maximum LLR greater than their respective threshold, the minimum number of accumulated frame criterion 042 will not be satisfied. Then the workflow will continue to the frame selection module 011 until there is only one LLR greater than its respective threshold.

The weighted average estimation 043 is similar to the one performed in the case when speaker characteristics are expressed as numerical values. There are two main differences for speaker characteristics with categorical values:

The first one is the weighted average models LLRs values instead of predicted values. The LLR value V at time t is defined as the same way as before:

$$V_t = \beta V_{t-1} + (1-\beta) S_t, \beta \in [0,1]$$

where, $s_t$ is the LLR value for a specific class at current time t and $v_{t-1}$ is the previous weighted average LLR value at time t−1, and β works as a hyperparameter, as before. In this case, the chosen value for β is also 0.9.

The second one is that the weighted average estimation is carried out for each class of a specific characteristic. Thus, there are as many weighted average LLRs values as classes. Once the minimum accumulated frames number criterion 042 is satisfied, the weighted average LLR is estimated for each class. Then, the weighted average LLR values for all the classes are compared among each other, at time t, and the maximum value is chosen. This value is considered the maximum LLR at time t.

The reliable prediction criterion 044 for a speaker characteristic with categorical values is similar to the minimum number of accumulated frames criterion 042. It is based on both LLRs and decision thresholds as for the minimum accumulated frames number criterion 042. It evaluates if the estimated maximum LLR from accumulated frames, provided by the weighted average estimation 043 at time t, is reliable enough to provide the final class of the speaker characteristic.

The weighted average estimation 043 provides the weighted average LLR values for each class to the reliable prediction criterion 044, which is satisfied once the maximum LLR value is greater than its respective decision threshold, i.e. the decision threshold of the most likely class. The thresholds selected for the reliability criteria can be the same as the ones used for the minimum number of frames criterion or more restrictive (meaning higher thresholds could be set) as the reliability prediction criterion is the last one to be satisfied before the speaker characteristics is included in the speaker profile.

In case of more than one maximum LLR greater than their respective threshold, the reliable prediction criterion 044 will not be satisfied. Then the workflow will continue to the frame selection module 011. If the criterion is satisfied, no more speech frames are processed and the speaker characteristic estimation is used and included in the speaker profile by means of module 050.

FIG. 14 on the top depicts the decision thresholds' estimation process (which is the same process used in FIG. 13 repeated here for clarity) for the reliable prediction criterion and the language prediction task. As mentioned earlier, for the reliability prediction criterion the thresholds selected can be different than the ones selected in FIG. 13.

FIG. 14 on the bottom represents the evaluation of a speech segment of accumulated selected frames at a time t by the reliable prediction criterion 044 for the language prediction task.

During the evaluation of the test speech segment, LLRs estimation for each class are provided by the reliable prediction module 044a. Then, the maximum LLR value, which corresponds to the most likely class, is selected. The maximum LLR value is compared to the decision threshold of the most likely class. The reliable prediction criterion 044 is satisfied if the maximum LLR value is greater than the decision threshold for the most likely class. Thus, as final class the most likely class is provided.

For instance, in case of the language prediction task, the maximum LLR value from the weighted average LLR values is 1.19, corresponding to English language. Assuming the decision threshold for English is 1.00, the LLR is greater than the threshold which satisfies the reliability prediction criterion. The English language class is then used by the speaker profiling module 050 to be included in the speaker profile.

For speaker profiling 050, all the characteristics estimated from the speech signal (e.g., age, gender, height, BMI and language) are used to fill out a speaker profile in the example embodiment. Each characteristic is added to the profile progressively as soon as a reliable estimate of the characteristic has been obtained.

In summary, the novelty of the present disclosure relies on three important modules which allow the system to achieve a high accuracy with a low latency. Those modules are the DNN-based frame selection 010, the real-time speaker characteristics estimation 030, and the stopping criteria 040.

The DNN-based frame selection allows to select the relevant frames necessary to provide a reliable speaker characteristic estimation. The frame selection module 010 selects those frames that contain relevant information for estimating a given speaker characteristic. This module contributes to the accuracy and the low latency of the system.

The real-time speaker characteristics estimation allows to estimate the speaker characteristics from a speech segment of accumulated selected frames at a time t. The frame level processing contributes to the low latency as it is not necessary to wait for the whole speech utterance to predict a speaker characteristic, in contrast with-state-of-the-art systems. We estimate a speaker characteristic with only a few reliable frames.

The stopping criteria includes two different sub-modules that contribute to the accuracy and the low latency of the system: the minimum accumulated frames criterion 042 and the reliable speaker characteristic prediction 044. The first one determines if a speech segment of accumulated selected frames is accurate enough with a certain degree of reliability to be accumulated by the weighted average estimation 043. The second criterion 044 evaluates if the speaker characteristic estimation at time t is reliable enough to be provided as a final prediction that will be included in a speaker profile by means of module 050.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for profiling an unknown speaker, such that a profile for a speaker includes a set of speaker characteristics, comprising:
receiving a speech signal from an unknown speaker, where the speech signal is comprised of a plurality of data frames;
for each speaker characteristic in the set of speaker characteristics, analyzing the plurality of data frames using machine learning;
for each speaker characteristic in the set of speaker characteristics, selecting a subset of data frames from the plurality of data frames based on the analysis of the plurality of data frames using a set of neural networks and thereby exclude other data frames in the speech signal from the subset of data frames, where the data frames in the subset of data frames contain information about the speaker characteristic of interest and a different neural network in the set of neural networks is implemented for each speaker characteristic in the set of speaker characteristics; and
for a given speaker characteristic, generating a feature vector from the subset of selected data frames corresponding to the given speaker characteristic and predicting a value for the given speaker characteristic from the feature vector using machine learning.

2. The computer-implemented method of claim 1 wherein speaker characteristics are selected from a group consisting of age, height, body mass index, gender, accent, dialect and race.

3. The computer-implemented method of claim 1 wherein selecting a subset of data frames further comprises implementing at least one classifier for each speaker characteristic.

4. The computer-implemented method of claim 1 wherein predicting a value for the given speaker characteristic further comprises implementing a neural network for each speaker characteristic.

5. The computer-implemented method of claim 1 further comprises
assessing reliability of the predicted value for the given speaker characteristic;
adding the predicted value for the given speaker characteristic to a profile for the unknown speaker when the predicted value for the given speaker characteristic is deemed reliable.

6. The computer-implemented method of claim 5 wherein assessing reliability of the predicted value for the given speaker characteristic further comprises comparing the predicted value to a prediction interval, and deeming the predicted value reliable when the predicted value falls within the prediction interval, where the prediction interval is based on a variance of a difference between predicted values for the given speaker characteristic and true values for the given speaker characteristic.

7. The computer-implemented method of claim 5 wherein assessing reliability of the predicted value for the given speaker characteristic further comprises comparing a log-likelihood ratio to a decision threshold, and deeming the predicted value reliable when the log-likelihood ratio exceeds the decision threshold, where the log-likelihood ratio evaluates a null-hypothesis that the predicted value does not correspond to a given speaker characteristic and an alternative hypothesis that the predicted value corresponds to the given speaker characteristic.

8. A computer-implemented method for profiling an unknown speaker, such that a profile for a speaker includes a set of speaker characteristics, comprising:
a) receiving a speech signal from an unknown speaker, where the speech signal is comprised of a plurality of data frames;
b) accumulating data frames from the plurality of data frames in a buffer;
c) generating, at a given time, a feature vector from the data frames accumulated in the data buffer;
d) predicting a value for a given speaker characteristic from the feature vector using machine learning, and assessing reliability of the predicted value for the given speaker characteristic;
e) determining that the predicted value for the given speaker characteristic is unreliable; and
f) repeating steps b) e) based on the determination that the predicted value for the given speaker characteristic is unreliable
wherein assessing reliability of the predicted value for the given speaker characteristic further comprises comparing a log-likelihood ratio to a decision threshold, and deeming the predicted value reliable when the log-likelihood ratio exceeds the decision threshold, where the log-likelihood ratio evaluates a null-hypothesis that the predicted value does not correspond to a given speaker characteristic and an alternative hypothesis that the predicted value corresponds to the given speaker characteristic.

9. The computer-implemented method of claim 8 wherein speaker characteristics in the set of speaker characteristics are selected from a group consisting of age, height, body mass index, gender, accent, dialect and race.

10. The computer-implemented method of claim 8 wherein the feature vector is generated from a number of data frames which varies over time.

11. The computer-implemented method of claim 8 wherein assessing reliability of the predicted value for the given speaker characteristic further comprises comparing the predicted value to a prediction interval, and deeming the predicted value reliable when the predicted value falls within the prediction interval, where the prediction interval quantifies uncertainty related to the predicted value.

12. The computer-implemented method of claim 8 wherein assessing reliability of the predicted value for the given speaker characteristic further comprises comparing the predicted value to a prediction interval, and deeming the predicted value reliable when the predicted value falls within the prediction interval, where the prediction interval is based on a variance of a difference between predicted values for the given speaker characteristic and true values for the given speaker characteristic.

13. The computer-implemented method of claim 8 wherein assessing reliability of the predicted value for the given speaker characteristic further comprises
comparing the predicted value to a prediction interval, where the prediction interval is based on a variance of a difference between predicted values for the given speaker characteristic and true values for the given speaker characteristic;
computing a weighted average using the predicted value and a previous weighted average when the predicted value falls within the prediction interval, where the previous weighted average is computed using at least one predicted value for the given speaker characteristic predicted from a feature vector generated at a time earlier than the given time;

comparing the weighted average to another prediction interval; and deeming the predicted value reliable when the weighted average falls within the prediction interval.

14. The computer-implemented method of claim 8 further comprises for each speaker characteristic in the set of speaker characteristics, predicting a value for a particular speaker characteristic from the feature vector using a corresponding neural network, where a different neural network is implemented for each speaker characteristic in the set of speaker characteristics.

15. The computer-implemented method of claim 8 further comprises repeating steps of accumulating data frames from the plurality of data frames in a buffer, generating a feature vector from the data frames accumulated in the data buffer, and predicting a value for each speaker characteristic in the set of speaker characteristics that is deemed unreliable, such that these steps are repeated until each speaker characteristic in the set of speaker characteristics are deemed reliable.

16. A system for profiling an unknown speaker, comprising:

a microphone configured to capture a speech signal from an unknown speaker;

a frame extractor configured to receive the speech signal from the microphone;

a frame selector configured to receive the speech signal from the frame extractor, wherein, for each speaker characteristic, the frame selector selects a subset of data frames from speech signal using machine learning and accumulates the subset of data frames in a buffer corresponding to the speaker characteristic, thereby excluding other data frames in the speech signal from the subset of data frames, where the data frames in the subset of data frames contain information about the speaker characteristic of interest;

a feature extractor configured to generate a feature vector from the data frames in the buffer;

a speaker estimator configured to receive the feature vector from the feature extractor and, for each speaker characteristic in the set of speaker characteristics, predict a value for a speaker characteristic from the feature vector using a first set of neural networks, where the speaker estimator implements a different neural network for each speaker characteristic in the set of speaker characteristics; and a speaker profiler configured to receive the predicted values for each speaker characteristic from the speaker estimator, where the speaker profiler assesses the reliability of the predicted value for each speaker characteristic and adds the predicted value for a given speaker characteristic to a speaker profile when the predicted value for the given speaker characteristic is deemed reliable wherein the frame selector selects a subset of data frames from each of the plurality of speech signals using a second set of neural networks and the frame selector implements a different neural network for each speaker characteristic in the second set of speaker characteristics.

17. The system of claim 16 wherein speaker characteristics in the set of speaker characteristics are selected from a group consisting of age, height, body mass index, gender, accent, dialect and race.

18. The system of claim 16 wherein the speaker profiler assesses reliability of the predicted value for a given speaker characteristic by comparing the predicted value to a prediction interval, and deeming the predicted value reliable when the predicted value falls within the prediction interval, where the prediction interval quantifies uncertainty related to the predicted value.

19. The system of claim 16 wherein the speaker profiler assess reliability of the predicted value by comparing the predicted value to a prediction interval, where the prediction interval is based on a variance of a difference between predicted values for the given speaker characteristic and true values for the given speaker characteristic; computing a weighted average using the predict value and a previous weighted average when the predicted value falls within the prediction interval, where the previous weighted average is computed using at least one predicted value for the given speaker characteristic predicted from a feature vector generated at a time earlier than the given time; comparing the weighted average to another prediction interval; and deeming the predicted value reliable when the weighted average falls within the prediction interval.

* * * * *